April 14, 1936.  E. W. GENT  2,037,162

CAMERA SUPPORTING AND CONTROLLING DEVICE

Filed March 24, 1933  2 Sheets-Sheet 1

INVENTOR
E. W. GENT
BY
G. H. Hoyt.
ATTORNEY

April 14, 1936.  E. W. GENT  2,037,162
CAMERA SUPPORTING AND CONTROLLING DEVICE
Filed March 24, 1933  2 Sheets-Sheet 2
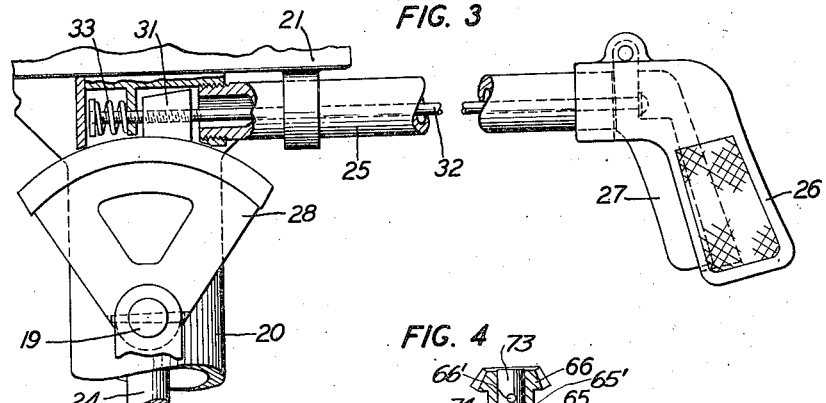
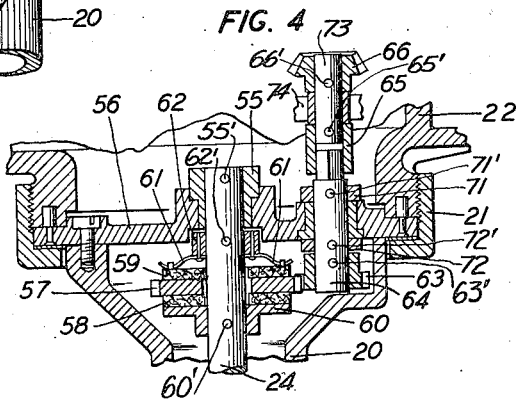
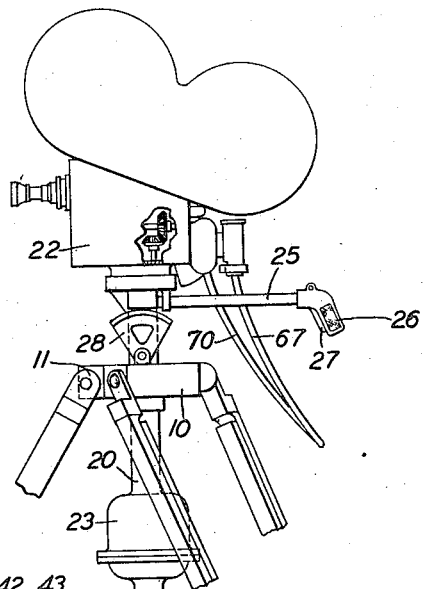
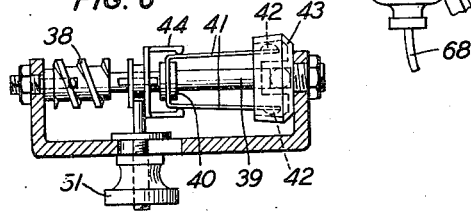
INVENTOR
E. W. GENT
BY
G. H. Heydt.
ATTORNEY Patented Apr. 14, 1936

2,037,162

UNITED STATES PATENT OFFICE 2,037,162

CAMERA SUPPORTING AND CONTROLLING DEVICE

Edgar W. Gent, Morristown, N. J., assignor to Bell Telephone Laboratories, Incorporated, New York, N. Y., a corporation of New York Application March 24, 1933, Serial No. 662,444

8 Claims. (Cl. 248—183)

This invention relates to camera supporting and controlling devices and has for its primary object the provision of certain improvements of such a device that will enable the camera mounted thereon to be operated more accurately and efficiently and with less effort on the part of the operator.

Another object is to lower the center of gravity of the combined camera and camera supporting structure.

Another object is to provide for the improved control of the camera during the recording of a scene when the action requires that the camera be tilted vertically or rotated horizontally and subsequently held in the new position.

Other objects will appear from the detailed description hereinafter given.

The embodiment of this invention which has been chosen for illustrating is disclosed in connection with a tripod stand for portable sound picture cameras.

In accordance with one feature of the invention the motor for driving the camera mechanism forms an integral part of the tripod preferably being mounted beneath the tripod platform adapted to receive the camera. A motor shaft extends to the camera mounting plate where it may be suitably coupled to supply the power for rotating the camera mechanism. The coupling is preferably through a friction clutch to prevent damage in case the film should buckle and tend to stop the camera mechanism.

In accordance with a second feature of the invention the speed of tilting or rotating the camera is controlled by independent governing devices. Each of these governing devices may comprise a flyball governor which is frictionally retarded during rotation, each governor being driven through a speed accelerating gear train when the camera is tilted or rotated.

In accordance with another feature of the invention the handle used for tilting the camera incorporates a trigger which is connected to a locking mechanism which normally holds the camera against movement in a vertical plane. When the trigger is operated the locking mechanism is released to enable the camera to be tilted as desired after which the release of the trigger will cause the camera to be locked in its new position. Still other features of the invention will appear hereinafter.

This invention will be better understood by reference to the following detailed description taken in connection with the accompanying drawings in which:

Fig. 3 is a side view partly in section of means provided by this invention for controlling the tilting of a camera mounted on the tripod head of Fig. 1;

Fig. 4 is a side view in section of the camera mounting plate supported by the tripod head of Figs. 1 and 2;

Fig. 5 is a general view in side elevation of a camera supported by a tripod of this invention; and Fig. 6 is a sectional view of a governor of the flyball type for controlling the speed of tilting or rotating the camera.

Figure 1:
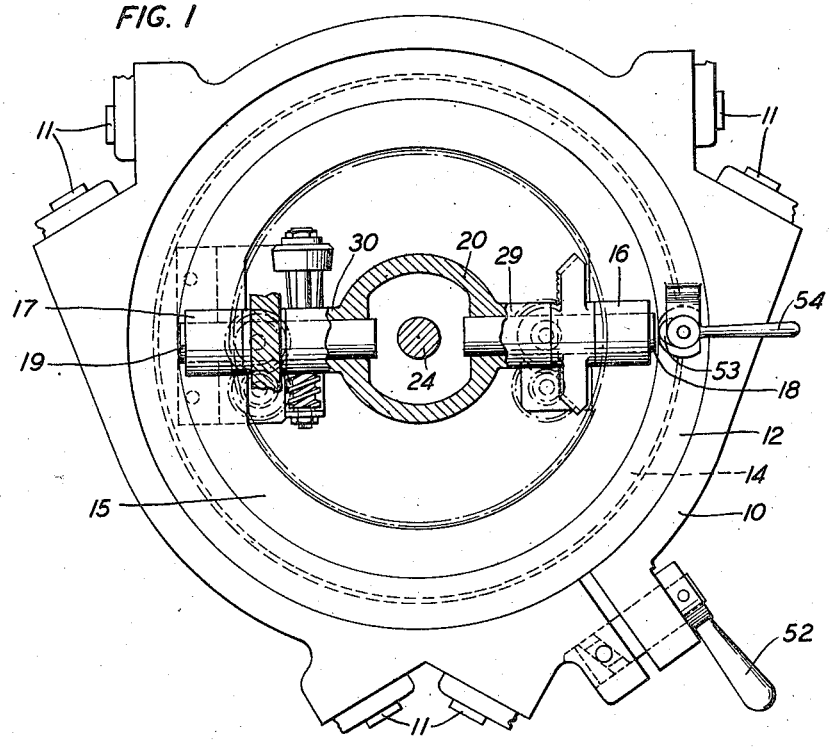
Fig. 1 is a top view partly in section of a camera tripod head embodying this invention.
Figure 2:
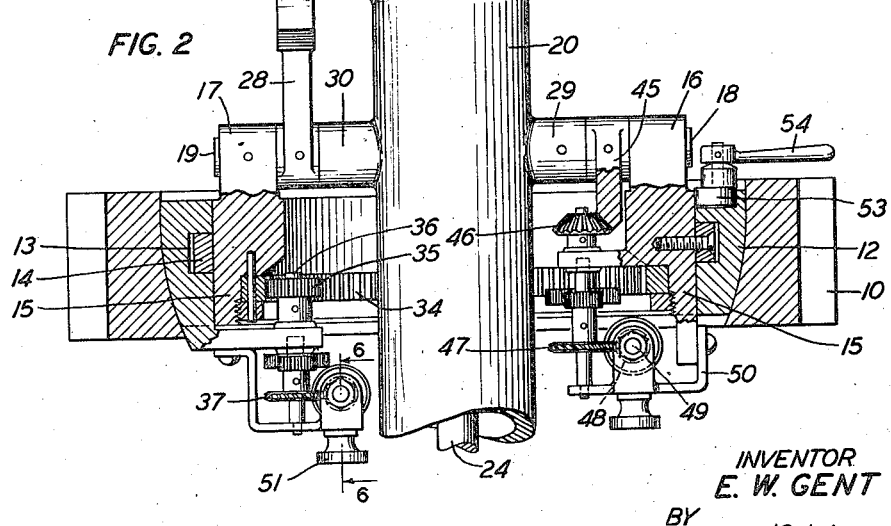
Fig. 2 is a sectional view in side elevation of the tripod head of Fig. 1.

Referring more particularly to Figs. 1 and 2, the tripod head disclosed therein comprises an outer stationary ring 10 to which the legs of the tripod may be attached as at the points 11. The inner stationary tripod ring 12 forms with the outer ring 10 the equivalent of a ball and socket joint for leveling purposes in a manner to be described later. These two rings 10 and 12 form the base or tripod head about which the camera may be rotated or tilted. The inner face of ring 12 has a slot 13 for receiving the supporting ring 14 attached to the main rotatable ring 15 of the camera support, ring 15 being free to rotate by relative movement between rings 12 and 14.

Projecting from the upper face of ring 15 are two members 16 and 17 for supporting the trunnions 18 and 19, trunnion 18 being freely rotatable in support 16 while trunnion 19 is fixed to support 17. The other end of trunnion 19 is rotatable in a bearing formed by an extension 30 of casing 20. The other end of trunnion 18 is suitably fixed to a sleeve or extension 29 of casing 20. Trunnion 18, therefore, rotates with casing 20 around its bearing in support 16 while trunnion 19 remains stationary. The upper end of casing 20 supports the knurled ring 21 for locking the camera 22 to the tripod (Figs. 4 and 5). Below the trunnions 18 and 19 the casing 20 passes through the center of ring 15 and terminates in an enlarged housing 23 enclosing a motor for driving the camera. Within the casing 20 is a shaft 24 coupled to the motor and extending upwardly to the mounting plate 56 in a manner to be described later.

It will be apparent that the camera 22 is supported for rotation in a horizontal plane by reason of ring 14 sliding around in the slot 13 while the camera may be tilted upwardly or downwardly by rocking movement of casing 20 about the axis defined by the trunnions 18 and 19. This shifting of the camera may be facilitated by the use of a handle 25 (Fig. 3) suitably attached to the side of casing 20 and terminating in a pistol grip 26. The pistol grip 26 has a trigger 27 which must be operated before the camera can be tilted. Rigidly mounted on non-rotatable trunnion 19 is an upwardly extending wheel segment 28, the rim of which is normally engaged by a spring pressed wedge 31 mounted on a rod 32 controlled by trigger 27. One end of rod 32 is surrounded by a coiled spring which in an obvious manner normally provides sufficient pressure of wedge 31 against segment 28 to prevent relative movement between the wedge and the segment. When the operator operates trigger 27 by grasping handle 26, wedge 31 will be rendered ineffective and the camera thereafter may be tilted to any desired angle after which the release of the trigger will permit the wedge 31 to hold the camera firmly in its new position due to the frictional engagement between wedge 31 and segment 28. Handle 25 is, of course, used by the operator for horizontal rotation of the camera as well as for tilting.

For the proper exposure of the film within the camera 22 it is essential to steady any movement of the camera so that the camera will not be started or stopped abruptly in its traversing movement and to insure that such movement will be uniform at each stage. In accordance with this invention the speed of rotation and tilting is controlled by two separate governing devices preferably of the flyball type. The internal ring gear 34 (Fig. 2) mounted inside rotatable ring 15 drives the gear 35 mounted on a vertical shaft 36 suitably supported by the non-rotatable ring 12. Shaft 36 by a suitable accelerating gear train drives a gear 37 which meshes with a worm 38 (Figs. 2 and 6) mounted on the governor shaft 39. A pair of springs 41 having weights or balls 42 at their free ends is attached to a collar 40 fixed to shaft 39. These balls 42 are normally out of contact with the inner surface of a stationary cup 43 but when shaft 39 is rotated due to the rotation of the camera the balls due to centrifugal action frictionally engage the inner surface of the cup in an amount determined by the speed of rotation. The device just described, therefore, acts to steady the speed at which the camera may be moved in a horizontal plane. An adjustable collar 44 is provided for determining the amount of the retarding action of the governor since, as will be seen in Fig. 6, the movement of collar 44 parallel to shaft 39 will vary the effective length of springs 41, the longer the springs 41 the greater the retarding force exerted by the governor. The position of collar 44 may be readily adjusted by thumb screw 51.

A similar type of governor is also used to regulate the speed with which the camera may be tilted. Mounted on rotatable trunnion 18 (Fig. 2) is a downwardly directed beveled gear segment 45 meshing with gear 46 mounted on a vertical shaft which by a speed accelerating train of gears drives gear 47 which meshes with a worm 48 on a shaft 49 to drive a flyball governor identical in construction with the one disclosed in Fig. 6, the governor being suitably supported from a bracket 50 attached to the rotatable ring 15. The speed of tilting the camera will, therefore, be steadied and controlled by the flyball governor operated by the gear segment 45.

An important advantage in employing governors of the flyball type for the above described apparatus is that in starting a camera movement there is no substantial inertia in the governor which must first be overcome, as would be the case, for example, if a flywheel were driven by a gear train. It is also advantageous to employ separate governor devices for camera rotation and camera tilting since it permits independent regulation of the speed of the two movements.

The invention also provides a ready means for leveling the bed plate 12 of the tripod by reason of the ball and socket joint formed by rings 10 and 12, ring 10 being split as shown in Fig. 1 to permit the leveling of plate 12 within ring 10 after which a lever 52 may be operated to lock the bed plate 12 in its proper position. The inner rotating ring 15 of the tripod may also be held in a desired position by a locking cam 53 operated by a lever 54 suitably mounted on the outer adjustable ring 12.

Since, according to this invention, the motor forms a part of the tripod, special coupling means must be provided to supply power from the motor to the camera. As shown in Fig. 4 the upper end of driving shaft 24 terminates in a rotatable bearing 55 secured to shaft 24 by means of pin 55'. The bearing rotates on a bearing surface in a camera mounting plate 56 secured to the upper end of casing 20. The gear 57 loosely mounted on shaft 24 is driven from this shaft by means of a slipping clutch mechanism including a member 60 secured to shaft 24 by pin 60', a member 62 secured to shaft 24 by means of pin 62' and friction discs 58 and 59 which bear against the opposite sides of gear 57. Springs 61 are secured to member 62 with their free ends bearing against disc 59 to insure sufficient frictional engagement of the discs 58 and 59 with gear 57 to produce rotation thereof. The frictional engagement between the members may be adjusted when necessary by changing the curvature of the spring 61 or means may be provided for adjustably mounting the member 62 along the shaft 24. Gear 57 drives a gear 63 secured to a shaft 64 by means of pin 63'. Shaft 64 projects through plate 56. Collars 71 and 72 secured to shaft 64 by pins 71' and 72', respectively, maintain the shaft 64 in a fixed vertical position and provide a bearing for this shaft on plate 56. The upper portion of shaft 64 is squared as is the lower portion of a sleeve 65. A shaft 73 is rotatably supported in a bearing located in a fixed member 74 in camera 22. Gear 66 is secured to the upper end of shaft 73 by pin 66'. Sleeve 65 is secured to shaft 73 by means of a pin 65'. It will be seen that as the camera 22 is mounted on plate 56, the lower part of sleeve 65 will fit over the upper end of shaft 64 to provide a driving connection from the driving shaft 24 to the camera gear 66 through gears 57 and 63. In the event the gear 66 is stopped due to a jamming of the film in the camera or for some other reason, the gear 57 will remain stationary and the discs 58 and 59 will continue to rotate without carrying the gear 57. In this manner, damage to the film in the camera is prevented before the driving motor can be stopped. The complete unit with camera 22 mounted on the tripod is shown in Fig. 5 where the sound currents to be recorded on the film are supplied to the camera by a cable 70 while current for supplying the picture lamp with exciting current is fed through a cable 67. Electric power to drive the motor 75 in housing 23 is supplied through the cable 68. By incorporating the motor as a part of the tripod a considerable amount of weight is thereby removed from the camera and, therefore, more nearly equalizes the weight of the camera unit and the tripod unit, an important consideration from the standpoint of portability. The position of the motor shown in Fig. 5 also has the advantage that the center of gravity of the complete unit is lowered to a substantial degree.

It is to be understood that this invention is not limited to the particular embodiment described above but may possess widely different forms without departing in any wise from the spirit of this invention as defined in the appended claims.

What is claimed is:

1. A portable camera support comprising a mounting plate adapted to receive on one side a camera, a motor housing, a tripod head, a plurality of legs for supporting said tripod head, a ring rotatably mounted on said tripod head and a metallic casing pivotally mounted from said ring for supporting said plate above said ring and for supporting said housing below said ring.

2. A portable camera support comprising a mounting plate adapted to receive on one side a camera, a motor housing, a tripod head, a plurality of legs for supporting said tripod head, a ring rotatably mounted on said tripod head, a metallic casing pivotally mounted from said ring for supporting said plate and said housing, speed governing means for limiting the speed of rotation of said ring and separate speed governing means for limiting the speed of tilting of said casing about said ring.

3. A portable camera support comprising a mounting plate adapted to receive on one side a camera, a tripod head, a plurality of legs for supporting said tripod head, a ring rotatably mounted on said tripod head, a motor, a supporting casing for said motor and said plate extending through the center of said ring, said casing being pivotally mounted on said ring.

4. A camera mounting comprising a ring-shaped tripod head, a ring-shaped member rotatably mounted in said tripod head, a housing extending through the center of said ring-shaped member and pivotally mounted thereon, a camera mounting plate connected to said housing above said tripod head, a motor mounted in said housing below said tripod head, a driving shaft extending from said motor and having a terminal bearing in said mounting plate, a driven shaft extending through and rotatably mounted in said mounting plate, and a driving connection between said driving and said driven shafts.

5. A camera mounting comprising a ring-shaped tripod head, a ring-shaped member rotatably mounted in said tripod head and having an internal ring gear, a fly ball governor mounted on said tripod head, means connecting the internal ring gear of said ring-shaped member and said fly ball governor, a camera supporting member pivotally mounted on said ring-shaped member, a gear segment mounted to have pivotal movement with said camera supporting member, a second fly ball governor secured to said ring-shaped member, and means connecting said gear segment and said second fly ball governor whereby uniform speed of the tilting and traversing movements of said camera supporting member are obtained.

6. A portable camera support comprising a mounting plate adapted to receive on one side a camera, a tripod head, a plurality of supporting legs for said tripod head, a ring rotatably mounted on said tripod head, a motor, a supporting casing for said motor and said plate extending through the center of said ring and pivotally mounted thereon, and a rotatable shaft coupled to said motor and extending through said casing to a bearing in said plate.

7. A camera tripod comprising a mounting plate adapted to receive a camera, a tripod head, a ring rotatably mounted in said tripod head, a supporting casing pivotally mounted from said ring, said plate being mounted on said casing, a handle for normally controlling the position of said plate, means for locking said plate against a pivoting movement, and means controlling said locking mechanism comprising a trigger member movably mounted in said handle and connected to said locking means.

8. A portable camera support comprising a mounting plate adapted to receive a camera, a tripod head, a plurality of adjustable means for supporting said tripod head, a ring rotatably mounted in said tripod head, a casing pivotally mounted from said ring as a support for said plate whereby said plate is movable in a vertical plane with respect to the horizontal plane of said tripod head, mechanism for locking said plate against movement in said vertical plane, a handle for controlling the position of said plate, means for operating said locking mechanism, said means comprising a trigger means movably mounted in said handle, and means connecting said trigger means to said locking mechanism.

EDGAR W. GENT.